April 20, 1926.
W. J. O'LEARY
1,581,594
SPEED CHANGING METHOD AND APPARATUS
Filed June 26, 1924
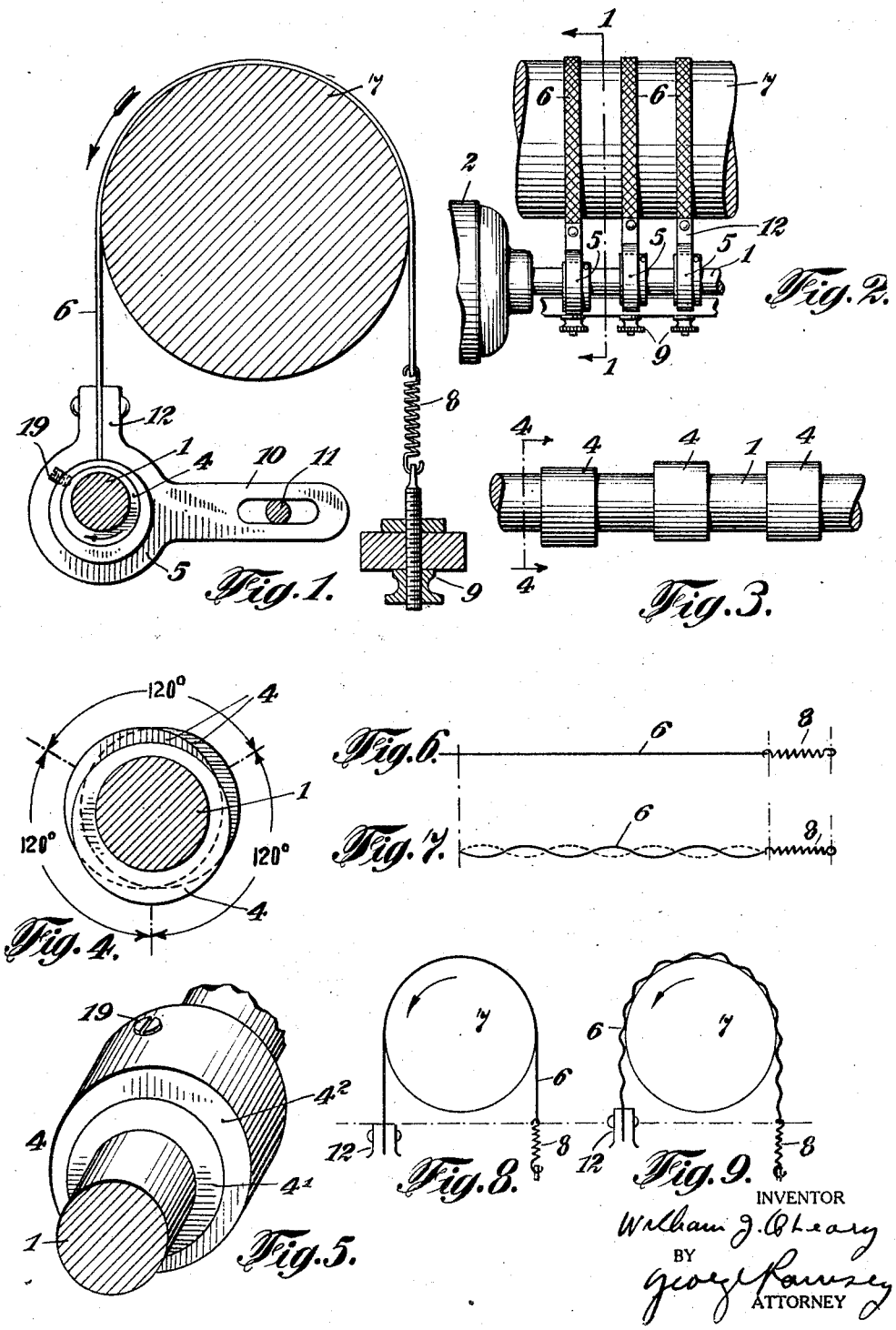

Patented Apr. 20, 1926.

1,581,594

UNITED STATES PATENT OFFICE.

WILLIAM J. O'LEARY, OF MONTREAL, QUEBEC, CANADA.

SPEED-CHANGING METHOD AND APPARATUS.

Application filed June 26, 1924. Serial No. 722,465.

*To all whom it may concern:*

Be it known that I, WILLIAM J. O'LEARY, a citizen of Canada, residing at Montreal, in the Province of Quebec, Dominion of Canada, have invented certain new and useful Improvements in Speed-Changing Methods and Apparatus, of which the following is a specification.

This invention relates to speed changing methods and apparatus, and particularly a method of and apparatus for reducing the angular velocity of rotary motion.

The principal objects of the invention are to provide an efficient method of and, to provide an efficient apparatus for, obtaining large changes in the angular velocity of rotary motion.

Another object of the invention is to provide a method of effecting large changes in the angular velocity of rotary motion without the aid of intermediate rotary motion.

An important object of the invention is to provide an inexpensive, compact apparatus for effecting large reductions in the angular velocity of rotary motion.

Another object of the invention is to provide a simple, rugged apparatus for reducing the angular velocity of rotary motion.

Heretofore in the art, it has been customary to change the angular velocity of rotary motion by belt drives or various forms of gearing. The prior art types of belt drives are not suitable for many classes of service; and where large changes in the angular velocity of rotary motion are required, they assume a size which is very undesirable in a great many instances. Gearing is satisfactory for many purposes, but where it is necessary to effect very large changes in the angular velocity of a rotary motion, such as for example, where high speed motors are used to drive very low speed apparatus, it is necessary to use multiple stages of gearing. In these cases, the power which is dissipated in friction becomes considerable and hence the total efficiency of the apparatus may be considerably reduced.

Another disadvantage of using the various known types of gearing for effecting large reductions in the angular velocity of rotary motion is that the elements employed are relatively expensive to manufacture due in part to the careful and precise cutting and machining required.

The present invention overcomes the difficulties of the known prior art by the provision of a method of reducing the speed of rotary motion in which the initial rotary motion is converted into vibratory motion which in turn is converted into wave motion, which wave motion is reconverted into rotary motion at a reduced angular velocity. In accordance with the present invention this method may be carried out in connection with an apparatus comprising a pair of rotary members, the first of which is a slow speed member driven mediately by the second which is a high speed member. A tensioned transmission band is wrapped around the first member and is arranged to have one end rapidly oscillated by suitable means, such as an eccentric actuated by the second or high speed rotary member, thus setting up wave motions in the transmission band which causes the first member to rotate unidirectionally. The end of the transmission band is oscillated only once for each revolution of the high speed member and as a very large number of oscillations of the transmission band are required to produce a single rotation of the low speed member, very large reduction in the angular velocity of the initial rotary motion is effected.

It is realized that the present invention may be embodied in forms other than that specifically illustrated and described and hence it is desired that the present disclosure be considered as illustrative and not in the limiting sense.

Figure 1 of the drawings is a sectional view taken on the line 1—1 of Figure 2 and more or less diagrammatically showing a reduction unit embodying the present invention.

Figure 2 is a diagrammatic elevational view showing the reduction unit of Figure 1.

Figure 3 is a fragmentary elevational view showing the high speed rotary member and the portions of eccentrics integral therewith.

Figure 4 is a sectional view taken on the line 4—4 of Figure 3 showing the relative angular position of the eccentrics.

Figure 5 is a fragmentary perspective view of the high speed rotary member showing the two part construction of the eccentrics.

Figures 6 to 9 inclusive are diagrammatic views illustrating the operation of the invention.

Referring particularly to Figures 1 and 2, a shaft 1 is driven by a high speed motor 2 and carries three eccentrics 4. Cooperating with each eccentric 4 is a collar 5 to which is attached by bracket portion 12 one end of a transmission band 6 wrapped about a slow speed shaft 7 and tensioned by a spring 8. Integral with collars 5 are arms 10 having slots cooperating with a fixed pin 11 which prevents rotation of the arms 10 while allowing them to reciprocate horizontally. As shaft 1 rotates, both vertical and horizontal motion is imparted to the bracketed portions 12 thus imparting an oscillatory motion to the ends of bands 6 and setting up wave motion in the bands which act on slow speed member 7 and rotate it in the direction indicated by the arrow.

The operation of the bands in imparting rotary motion to the driven member 7 will be more clearly understood by a reference to Figures 6 to 9 inclusive. Considering the organization of one of the bands and assuming that bracket 12 is initially in its lowermost position, band 6 is held taut by the spring 8, as illustrated in Figures 6 and 8. When the shaft 1 starts to move, the bracket 12 moves up and down, thus reciprocating the corresponding end of the band 6 as illustrated by the relation between Figures 6 and 7 and the relation between Figures 8 and 9. The bracket 12 in addition to moving vertically, however, moves horizontally, thus aiding in imparting transverse wave motion to the band 6 as illustrated in Figures 7 and 9. During this operation the spring 8 assumes a steady state position, thus in effect, holding the corresponding end of the band 6 in a fixed position. As the bracket 12 continues its movement the attached end of band 6 moves back and forth from the position shown in Figure 6 to that shown in Figure 7 or the position shown in Figure 8 to that shown in Figure 9 and sets up a wave motion traveling from the spring end of the band to the bracket end of the band. This wave motion results in the band being more or less straight, as indicated in Figures 6 and 8, when the eccentric is in its lowermost position, the band then being in the condition midway between the form shown in solid lines in Figure 7 and that shown in dotted lines in the same figure. On alternate upstrokes of the eccentric, the band is in the condition shown in solid lines in Figure 7, and on the intermediate upstrokes it is in the condition shown in dotted lines. It is thus seen that the wave motion in the band progresses through a complete cycle for every two revolutions of the shaft 1. This wave motion travels from the spring end of the band to the eccentric end of the band, driving the member 7 in the direction indicated by the arrow.

The wave forms shown in Figures 7 and 9, are exaggerated for the purpose of illustration. It is probable that wave motions other than that described exist in the band; and hence, applicant does not desire to be limited by the foregoing explanation of the operation.

The spring 8 is not essential to the functioning of the device as the wave motion is produced even if the end of the band is rigidly fixed. However, the spring is desirable in order to prevent the band from becoming loose due to it being stretched under operation; and it is desirable that the spring 8 be provided with adjusting means 9 in order that the tension on the band may be varied as desired.

As shown in Figure 5 each of the eccentrics 4 consists of two parts, an inner part $4_1$ and an outer part $4_2$, each part being eccentric and the inner part $4_1$ being integral with the shaft 1. The outer part $4_2$ is angularly adjustable with respect to the inner part and may be affixed in any angular position by means of a set screw 19. Thus, by adjusting the outer part $4_2$ with respect to the inner part $4_1$, the effective eccentricity of the eccentric may be varied, thereby changing the magnitude of the oscillatory or vibratory motion imparted to the eccentric end of belt 6.

The invention is illustrated in a form in which there are three independent transmission bands vibrated severally by three eccentrics which are positioned 120° apart on the same shaft. The invention contemplates any suitable number of transmission bands and eccentrics, but the form shown is a desirable one since the time interval between successively driving strokes is uniform and is much shorter than the time interval between successive strokes of a single band.

It is seen that the present invention provides a method of and apparatus for obtaining large reduction in the angular velocity of rotary motion without the use of intermediate rotary motions and without the use of expensive parts such as gears and the like which require accurate machining. The entire structure is exceedingly simple and compact; and it has been found that the method of driving a slow speed member by wave motion in a transmission band produces a reduction unit of very high efficiency.

Having thus described my invention, what I claim is:

1. Apparatus of the character described comprising a pair of rotatable members; a belt contacting with the first rotatable member; means to uni-directionally rotate the second rotatable member, and means to impart vibratory motion to said belt in response to the rotation of the second member, to uni-directionally rotate the first member.

2. Apparatus of the character described comprising a pair of rotatable members; a belt contacting with the first rotatable member; means to maintain said belt under tension; means to uni-directionally rotate the second rotatable member, and means to impart vibratory motion to said belt in response to the rotation of the second member, to uni-directionally rotate the first member.

3. Apparatus of the character described comprising a pair of rotatable members; a belt contacting with the first rotatable member; means to maintain said belt under tension; means to uni-directionally rotate the second rotatable member, and means to cyclically vary the tension of said belt in response to the rotation of the second member, to uni-directionally rotate the first member.

4. Apparatus of the character described comprising a pair of rotatable members; a transmission band contacting with the first rotatable member; and means to rapidly oscillate a portion of the band to and fro in response to rotation of the second member, to impart to the belt a wave motion adapted to rotate the first member uni-directionally.

5. Apparatus of the character described comprising a pair of rotatable members; a transmission band contacting with the first rotatable member; and means for rapidly oscillating a portion of the band to and fro in the direction of its length in response to rotation of the second member, to impart to the belt a wave motion adapted to rotate the first member uni-directionally.

6. Apparatus of the character described, comprising a pair of rotatable members; a belt contacting with the first rotatable member; means to hold one end of said belt substantially stationary; and means to vibrate the other end of said belt in response to rotation of the second member.

7. Apparatus of the character described comprising a pair of rotatable members, a belt contacting with the first rotatable member, and means to whip said belt transversely in response to rotation of the second rotatable member.

8. A unit for reducing angular velocity comprising a rotatable shaft; a plurality of belts wrapped around said shaft; a second rotatable shaft; a plurality of eccentrics carried by said shaft, one for each of said belts; means for tensioning said belts; and means connecting said belts severally with said eccentrics; whereby a rotation of said second shaft imparts vibratory motion to said belts, to uni-directionally rotate said first shaft.

9. A unit for reducing angular velocity comprising a rotatable shaft; a plurality of belts wrapped around said shaft; a second rotatable shaft; a plurality of eccentrics carried by said shaft, said eccentrics being displaced angularly with respect to each other; means for tensioning said belts; and means connecting said belts severally with said eccentrics whereby a rotation of said second shaft imparts vibratory motion to said belts, to uni-directionally rotate said first shaft.

10. A unit for reducing angular velocity comprising a rotatable shaft, a plurality of belts wrapped around said shaft; adjustable means operative on one end of each of said belts to tension the same; a second rotatable shaft; a plurality of eccentrics carried by said second shaft, one for each of said belts; and means connecting said belts severally with said eccentrics; whereby a rotation of said second shaft imparts vibratory motion to said belts to uni-directionally rotate said first shaft.

WILLIAM J. O'LEARY.